United States Patent

[11] 3,594,639

[72] Inventors Abram Markovich Damsky
ulitsa Bratiev Vasilievykh, 7/4, kv. 6;
Boris Abelevich Seliber, ulitsa Rentgena,
15/31, kv. 53, both of Leningrad, U.S.S.R.
[21] Appl. No. 6,029
[22] Filed Jan. 23, 1970
[45] Patented July 20, 1971

[54] LIGHT-SPOT ELECTRICAL MEASURING INSTRUMENT
8 Claims, 10 Drawing Figs.

[52] U.S. Cl. ................................................. 324/97, 324/154
[51] Int. Cl. ..................................................G01r 13/38, G01r 13/40
[50] Field of Search .......................................... 324/154, 151 A, 97

[56] References Cited
UNITED STATES PATENTS

| | | | |
|---|---|---|---|
| 602,527 | 4/1898 | Sullivan | 324/97 |
| 2,107,936 | 2/1938 | Gardner | 324/97 X |
| 2,183,934 | 6/1937 | Heiland | 324/114 X |
| 2,993,403 | 7/1961 | Harries | 324/97 X |
| 3,274,490 | 9/1966 | Swanson | 324/151 X |

FOREIGN PATENTS

| | | | |
|---|---|---|---|
| 127,827 | 4/1950 | Sweden | 324/97 |
| 127,827 | 4/1950 | Sweden | |
| 516,212 | 2/1955 | Italy | 324/154 |

Primary Examiner—Alfred E. Smith
Attorney—Waters, Roditi, Schwartz & Nissen

ABSTRACT: A switchboard light-spot electrical measuring instrument having an instrument movement with a permanent core magnet wherein an axial aperture is provided, an annular soft iron yoke surrounding the core magnet and having an aperture for passage of a light beam produced by an optical system, a moving coil being placed in the air gap formed between the core magnet and the annular yoke so that the core magnet is inside the moving coil, the moving coil being rotatably supported by means of a pair of taut bands passing through the axial aperture and arranged within the moving coil; the moving coil supporting a mirror near the aperture in the annular yoke between the core magnet and the annular yoke essentially within the height of the moving coil to reflect the light beam back through the aperture and onto a translucent screen with an adjacent scale plate.

PATENTED JUL 20 1971 3,594,639

3,594,639

LIGHT-SPOT ELECTRICAL MEASURING INSTRUMENT

The present invention relates to edgewise light-spot electrical measuring instruments of the moving coil type, chiefly intended for switchboards and panel mountings.

The edgewise light-spot electrical measuring instruments having a moving coil energized by the current to be measured and a permanent core magnet or a soft-iron core, i.e. instruments of the D'Arsonval or iron-core electrodynamometer type are known (see, for instance, German Pat. No. 1,168,654, cl. 42d, 1/15.) The moving coil of these instruments is rotatably mounted in the air gap, wherein a magnetic field is produced by a permanent magnet or a fixed coil. The movement of these instruments is provided with a mirror mounted above or under the moving coil and connected with it. The light beam produced by a light source is reflected from the mirror onto a plane scale. To make the light beam lever longer, one or a plurality of fixed mirrors can be placed in the light beam path.

The essential disadvantage of the known edgewise light beam electrical measuring instruments is their considerable height, for instance their height-to-width ratio amounts to about 1:2. Owing to this fact the known instruments occupy an unreasonably large surface of distribution switchboards or control desks, the scales proper occupying less than 30 percent of that surface.

It is the principal object of the present invention to provide an edgewise light beam electrical measuring instrument with a considerably reduced height-to-width ratio. For instance the ratio can be reduced to 1:5 and even to 1:6, so that the scale will occupy practically the entire face surface of the instrument.

This object is achieved due to the fact that, according to the invention, the mirror connected with the moving coil is placed at the same height as the moving coil. This makes it possible to decrease substantially the height of the measuring mechanism and of the instrument as a whole without affecting its main parameters.

In addition, with the purpose of ensuring the light-beam passage of and from the mirror and minimizing the inertia moment of the instrument movement by bringing the mirror nearer to the rotation axis, provision can be made for an aperture in the magnetic structure. The resulting decrease in magnetic induction of the air gap is compensated by using high-coercivity permanent magnets.

The details of the present invention will become more fully apparent from a consideration of the following description of exemplary embodiments thereof, taken in conjunction with the accompanying drawings, in which.

Figure 1:
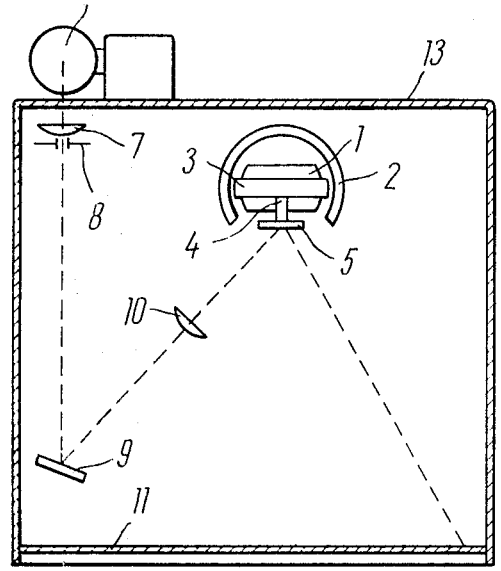
FIG. 1 shows schematically a plan view of the edgewise light-spot electrical measuring instrument comprising a moving coil core-magnet measuring mechanism according to the present invention.

Referring to the drawings in detail the instrument provided with the moving-coil permanent-magnet measuring mechanism comprises a cylindrical permanent core magnet 1 (FIG. 1) and an external annular soft-iron yoke 2, both being fixed immovably. An annular air gap is formed between the core magnet 1 and the soft-iron yoke 2, wherein a moving coil 3 rotates under the action of the torque developed due to the interaction between the current to be measured, flowing through the moving coil 3, and the magnetic field of the permanent magnet 1 in the air gap. A mirror 5 is fixed rigidly to the moving coil 3 through a holder 4 at the same height as the moving coil.

To reduce the inertia moment of the instrument movement comprising the moving coil 3, the mirror 5, and the holder 4, the mirror 5 is brought nearer to its rotation axis by cutting out, symmetrically, the parts of the cylindrical magnet 1 outside the active portions of the air gap and by making an aperture in the annular yoke 2 for the passage of the light beam.

Figure 2:
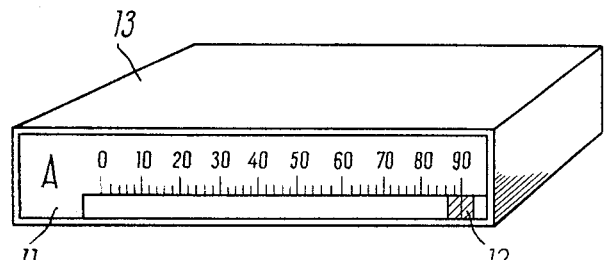
FIG. 2 is a perspective view somewhat schematic of the edgewise light-spot electrical measuring instrument, according to the invention.

The light beam is produced by an optical system comprising a light source 6, a condenser lens 7, a diaphragm 8, a fixed mirror 9 and an objective lens 10. The light beam produced by the optical system is reflected from the mirror 5 and is projected onto the mat plane scale 11 as a light spot 12 (FIG. 2), the position of which on the scale depends on the rotation angle of the moving coil 3. The measuring mechanism and the optical system are placed into an edgewise case 13 having the height-to-width ratio amounting to 1:5 or even to 1:6.

Any of the measuring mechanisms described below and made in accordance with the present invention can also be used in edgewise instruments.

Figure 4:
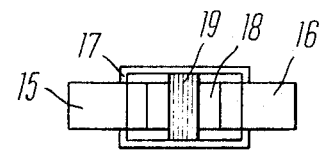
FIGS. 3 and 4 represent, schematically, plane and front views of a modification of the moving-coil permanent-magnet measuring mechanism with a soft-iron core for use in edgewise light-spot electrical measuring instruments, according to the invention.
Figure 3:
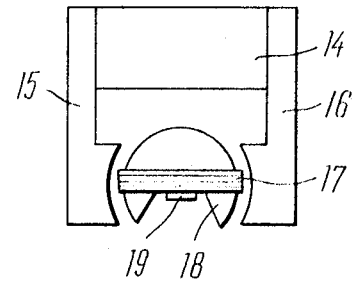

As shown in FIGS. 3 and 4 the moving-coil measuring mechanism includes a rectangular permanent magnet 14 with pole pieces 15 and 16. The measuring mechanism further includes a moving coil 17, inside which a soft-iron core 18 is placed. The core 18 has an aperture wherein a mirror 19 is located, the mirror 19 being fastened to the moving coil 17 at the same height level as that of the moving coil 17.

Figure 6:
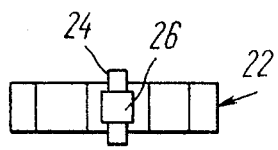
FIGS. 5 and 6 represent, schematically, plan and front views of a modification of the unipolar moving-coil permanent magnet measuring mechanism for use in edgewise light-spot electrical measuring instruments, according to the invention.
Figure 5:
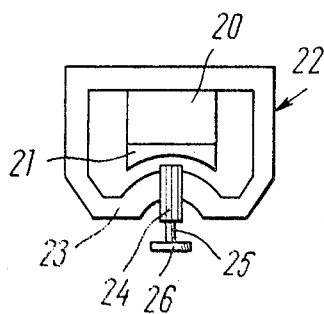

As illustrated in FIGS. 5 and 6 the unipolar moving-coil measuring mechanism comprises a rectangular permanent magnet 20 with a pole piece 21, and a soft-iron yoke 22. The yoke 22 has an arched portion 23, along which a moving coil 24 rotates about the external geometrical axis. A mirror 26 is fixed to the moving coil 24 through a holder 25 at the same height as the moving coil 24.

Figure 7:
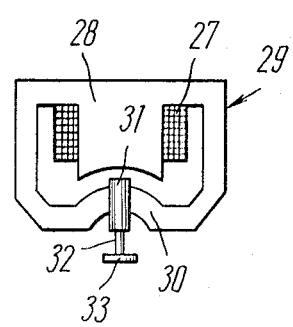
FIGS. 7 and 8 represent, schematically, plan and side views of the unipolar single-system iron-core electrodynamometer type measuring mechanism for use in edgewise light-spot electrical measuring instruments according to the invention.
Figure 8:
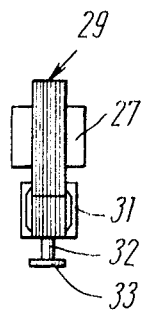

FIGS. 7 and 8 show a unipolar single-system measuring mechanism of the iron-core electrodynamometer type including a fixed field coil 27 which is placed on a projection 28 of a soft-iron yoke 29. The yoke 29 has an arched portion 30 along which a moving coil 31 rotates about the external geometrical axis. A mirror 33 is fixed to the moving coil 31 through a holder 32 at the same height as the moving coil 31.

Figure 9:
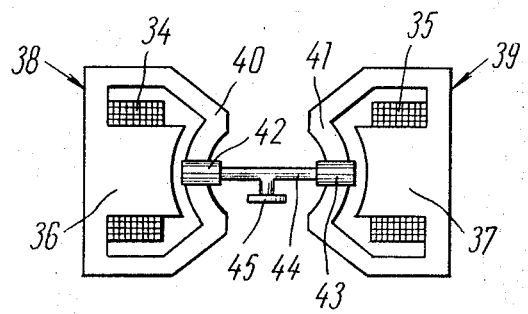
FIG. 9 represents schematically the unipolar double-system measuring mechanism of the iron-core electrodynamometer type for use in edgewise light-spot electrical measuring instruments, according to the invention.

FIG. 9 illustrates a unipolar double-system measuring mechanism of the iron-core electrodynamometer type, including fixed field coils 34 and 35 placed on projections 36 and 37 of soft-iron yokes 38 and 39 respectively. The yokes 38 and 39 have arched portions 40 and 41, along which moving coils 42 and 43 travel. The moving coils 42 and 43 are connected by a holder 44, to which a mirror 45 is fastened.

Figure 10:
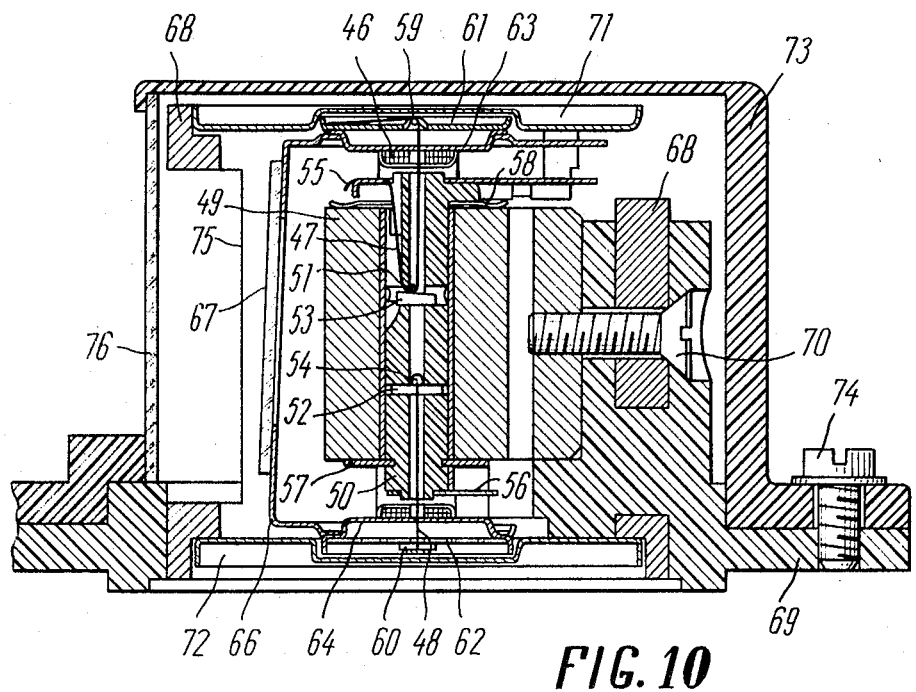
FIG. 10 is an axial section of the moving-coil core-magnet measuring mechanism for use in edge light-spot electrical measuring instruments, according to the invention.

Reference is now made to FIG. 10 showing the measuring mechanism of the present invention, comprising a moving coil 46 energized by the current to be measured. The moving coil 46 is rotatably mounted on taut-suspension bands 47 and 48 disposed, essentially, along the rotation axis of the moving coil 46. Inside the moving coil 46 a cylindrical permanent core magnet 49 is placed in the central aperture of which a cylindrical bushing 50 is inserted, said bushing being made of insulating material. The bushing 50 is provided with a through longitudinal aperture and with radial apertures normal to each other and disposed in two parallel planes, said apertures accommodating cylindrical pins 51, 52 and wedges 53, 54.

The taut-suspension bands 47 and 48 are passed from opposite sides through the longitudinal aperture in bushing 50 and around pins 51, 52 against which the taut-suspension bands 47, 48 are pressed by the wedges 53, 54, then they are led out from the bushing 50 and welded to current leads 55, 56 fixed on the end face portions of the bushing 50. The bushing 50 is fixed in position by a slide member 57 and a blade spring 58.

The external portions of the taut-suspension bands 47, 48 are passed through the apertures in the moving coil 46 and around pins 59, 60, being then fixed to the periphery portions of flat disc springs 61, 62, said springs being turnably mounted in annular holders 63, 64 fixed to the opposite sides of the moving coil 46.

Holders 65, 66 fixed to the annular holders 63, 64 are used for fixing a mirror 67 to the moving coil 46. The moving coil 46, annular holders 63, 64, holders 65, 66 and mirror 67 constitute the instrument movement. The permanent magnet 49 together with the instrument movement is placed inside an annular soft-iron yoke 68 pressed in a frame unit 69 of plastic. The magnet 49 is fixed to the frame unit 69 by a screw 70.

In the recesses made in the yoke 68 retainers 71 and 72 are placed, said retainers preventing the instrument movement from undergoing displacements which may be caused by mechanical effects, and simultaneously the retainers serve as covers. The measuring mechanism is closed by a common cover 73 fixed by screws 74 (there is shown only one). For letting the light beam pass to the mirror 67 the yoke 68 is provided with an aperture 75, and the cover 73 has an aperture 75 closed by a glass plate 76.

Though the present invention is described in connection with a preferred embodiment thereof, it is evident that there may be made other modifications and variations without departing from the spirit and scope thereof, as will be clear to those skilled in the art.

We claim:

1. A switchboard light-spot electrical measuring instrument comprising an optical system for producing a light beam; a permanent core magnet having an axial aperture therein; an annular soft iron yoke surrounding said core magnet to form a gap therewith, said yoke being provided with an aperture for passage of the light beam therethrough; an instrument movement including a moving coil within said gap, said core magnet being inside said moving coil, mounting means extending within the moving coil and supporting said moving coil for rotation, said mounting means comprising a pair of taut-bands with ends secured within said core magnet and passing through said axial aperture and arranged within said moving coil, a mirror for reflecting the light beam, means extending externally of said coil and mounting said mirror adjacent said aperture in said annular yoke outside said core magnet and between said core magnet and said annular yoke essentially within the height of the moving coil, the latter means fastening said mirror to said moving coil for common movement therewith; a scale plate having divisions thereon; and a translucent screen on which a light spot is projected by reflection from said mirror, said screen being disposed along said scale plate and in the same plane as said scale plate said mirror and said aperture in the annular yoke being of substantially the same height as said coil.

2. An instrument as claimed in claim 1, wherein said permanent core magnet is in the form of a cylindrical body, a part of which, opposite said aperture in the yoke, is removed.

3. An instrument as claimed in claim 1, wherein said core magnet is confined within the height of the moving coil.

4. An instrument as claimed in claim 1, comprising retainer means mounted in said yoke for said instrument movement and serving as a cover therefor.

5. An instrument as claimed in claim 1 wherein said mounting means comprises a bushing mounted within said axial aperture in the core magnet, said ends of the taut bands being secured in said bushing.

6. An instrument as claimed in claim 5 wherein said taut-bands have opposite ends which are fixed immediately outside the moving coil.

7. An instrument as claimed in claim 5 wherein said means mounting said mirror from said coil comprises flat annular holders fixed to said moving coil and having apertures for passage of the taut-bands therethrough.

8. An instrument as claimed in claim 7, comprising flat members fixed in said yoke and rotatably supporting said annular holders, said taut-bands having opposite ends secured to said flat members.